Figure 20:
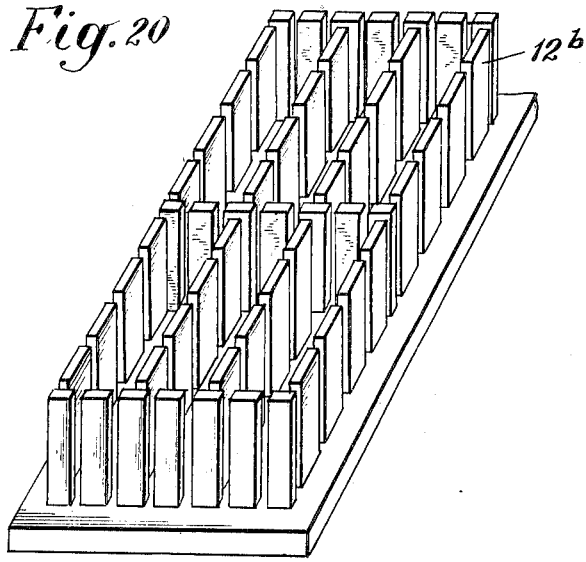

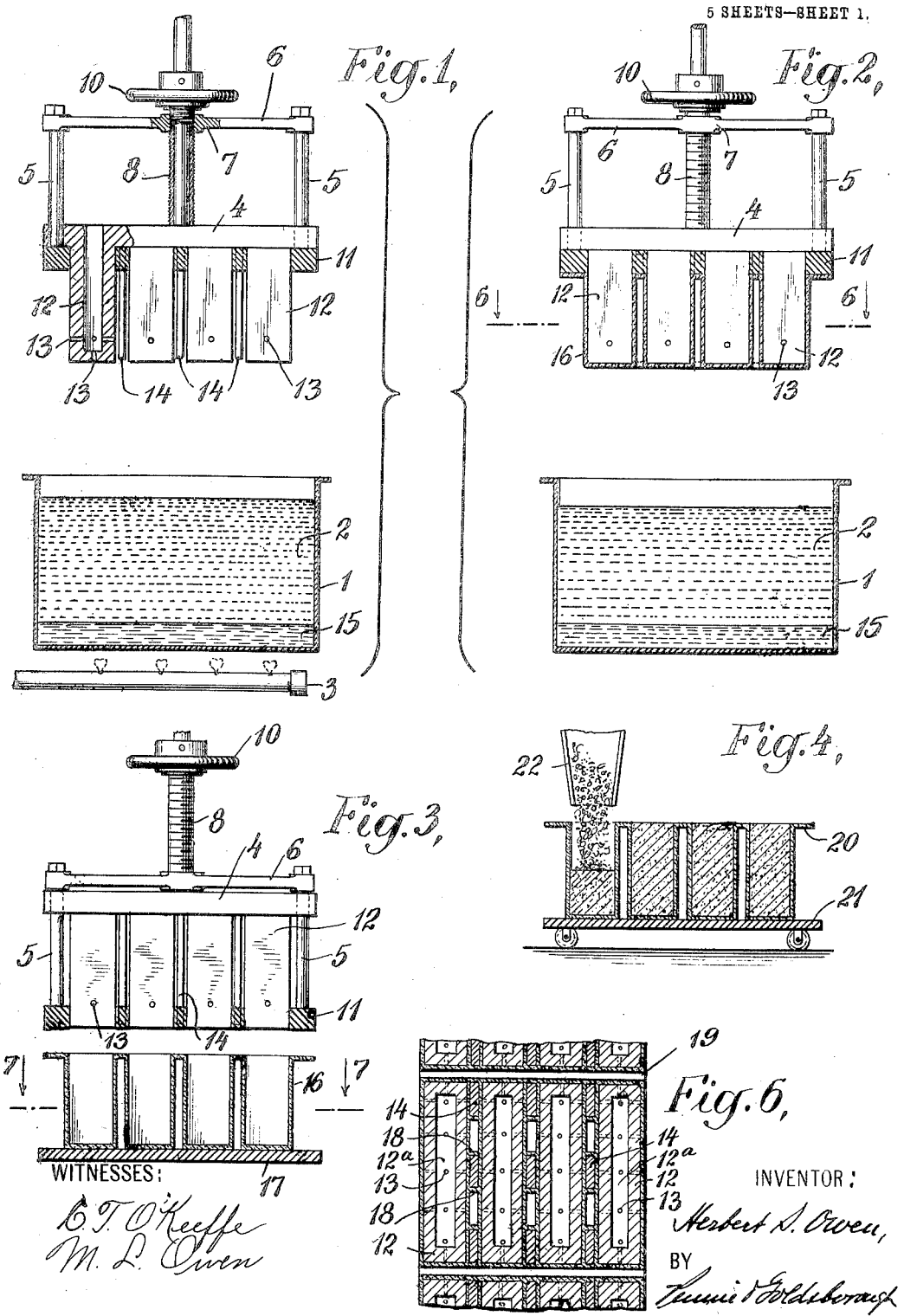

H. S. OWEN.
MANUFACTURE OF PRODUCTS OF CONCRETE, CEMENT, AND THE LIKE.
APPLICATION FILED APR. 1, 1910.
1,087,974.
Patented Feb. 24, 1914.
5 SHEETS—SHEET 2.
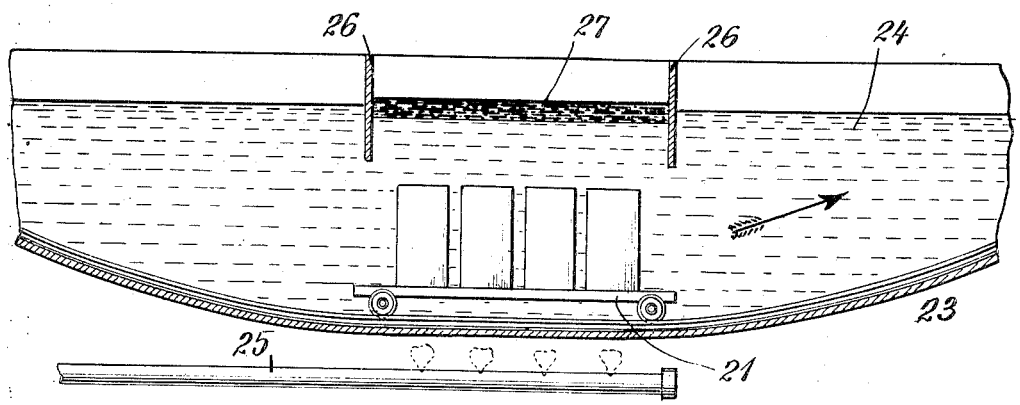
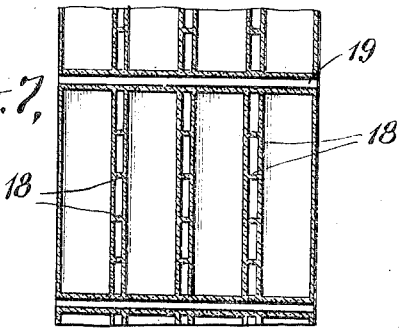
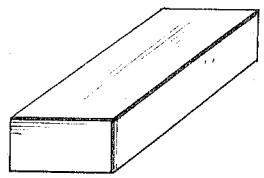
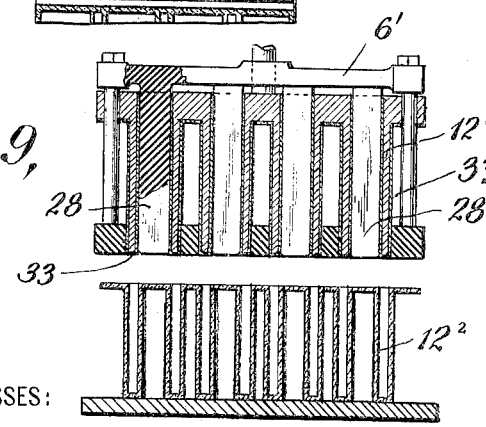
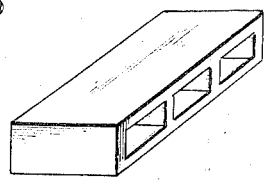
WITNESSES:
INVENTOR:
Herbert S. Owen,
BY
ATTORNEYS.

H. S. OWEN.
MANUFACTURE OF PRODUCTS OF CONCRETE, CEMENT, AND THE LIKE.
APPLICATION FILED APR. 1, 1910.
1,087,974.
Patented Feb. 24, 1914.
5 SHEETS—SHEET 3.
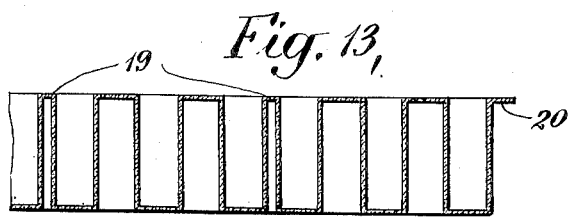
Fig. 13.
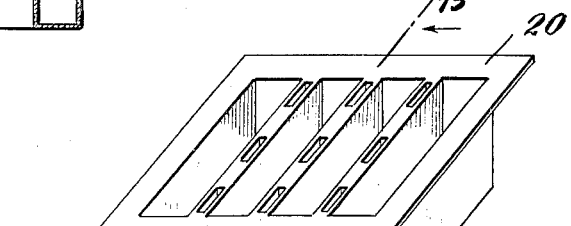
Fig. 11.
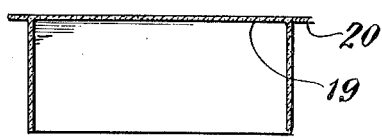
Fig. 14.
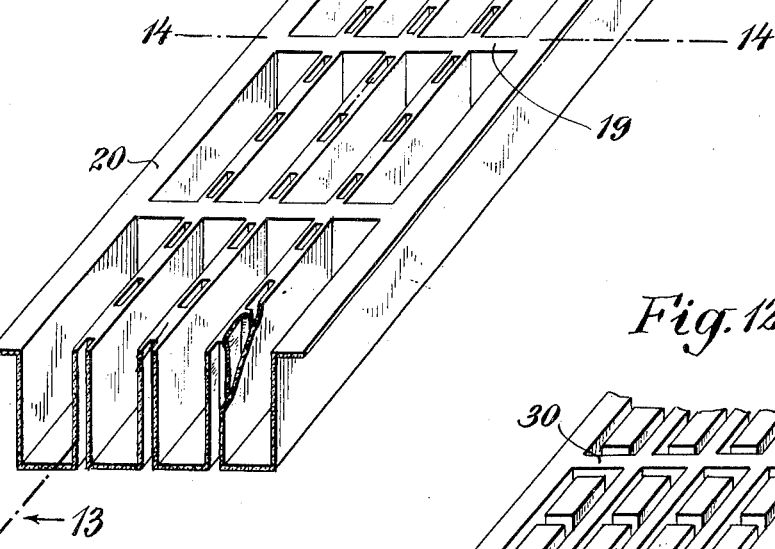
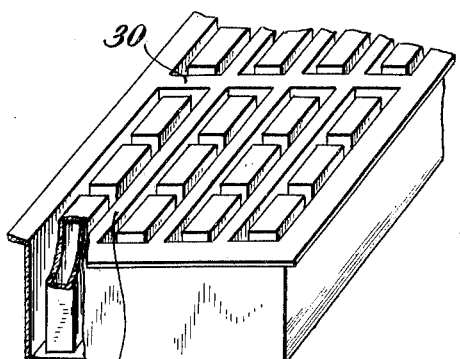
Fig. 12.
WITNESSES:
C. T. O'Keeffe
M. L. Owen
INVENTOR:
Herbert S. Owen,
BY
Jennie F. Goldsborough
ATTORNEYS.

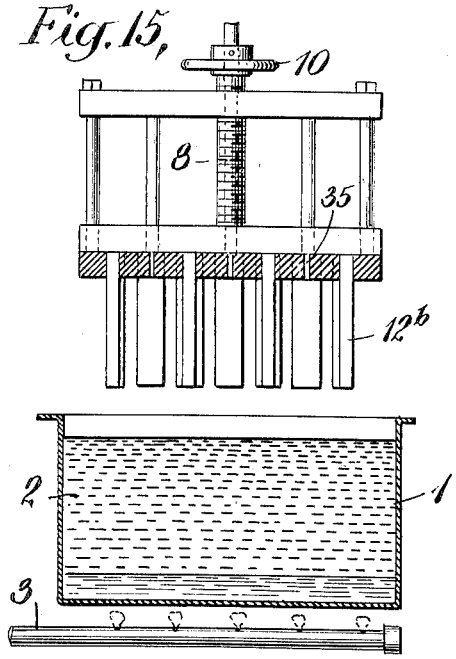
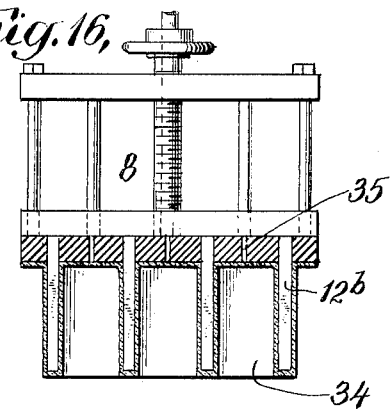
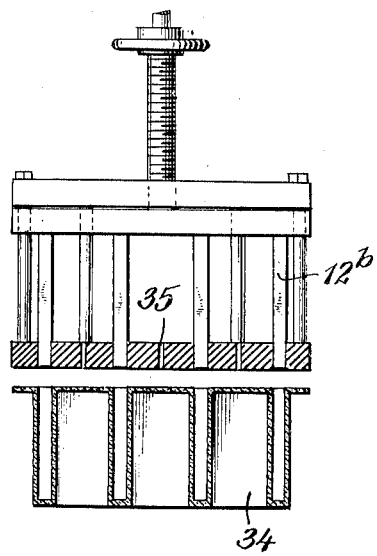
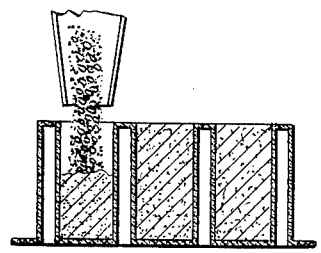
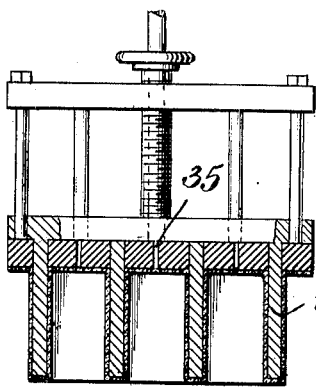

H. S. OWEN.
MANUFACTURE OF PRODUCTS OF CONCRETE, CEMENT, AND THE LIKE.
APPLICATION FILED APR. 1, 1910.

1,087,974.

Patented Feb. 24, 1914.

5 SHEETS—SHEET 5.

WITNESSES:
C T O'Keeffe
M. L. Owen

INVENTOR
Herbert S. Owen,
BY
ATTORNEYS

UNITED STATES PATENT OFFICE.

HERBERT S. OWEN, OF SALT LAKE CITY, UTAH.

MANUFACTURE OF PRODUCTS OF CONCRETE, CEMENT, AND THE LIKE.

1,087,974.  Specification of Letters Patent.  Patented Feb. 24, 1914.

Application filed April 1, 1910. Serial No. 552,871.

*To all whom it may concern:*

Be it known that I, HERBERT S. OWEN, a citizen of the United States, residing at 841 South Temple street, Salt Lake City, county of Salt Lake, State of Utah, have invented certain new and useful Improvements in Manufacture of Products of Concrete, Cement, and the like; and I do hereby declare the following to be a full, clear, and exact description of the invention, such as will enable others skilled in the art to which it appertains to make and use the same.

My invention relates to certain new and useful improvements in the manufacture of products made from compositions which are adapted to be poured or otherwise introduced in a relatively cool condition, into molds and to subsequently set therein. A familiar instance of these compositions is what is conventionally known as concrete, used extensively in the manufacture of concrete blocks, tiles, bricks, and the like, and consists of cement (usually Portland cement, although other cements, such as magnesia cement, may be employed), together with sand, or sand and gravel. It will be understood, however, that the material concrete is but typical of many other compositions of a similar character in so far as their pouring and setting qualities are concerned, which are adapted for use in connection with my invention, as will hereinafter more fully appear. It will likewise be evident that my invention is not restricted to the manufacture of blocks, tiles and bricks, but is applicable to many other products of an analogous character, such as slabs, fence-posts, beams, drain-pipes, sewer-pipes, shingles, and the like, either solid, cored, paneled, frogged, or hollow.

The practice of my invention permits me to manufacture these products at a reasonable cost on a very large scale. Its main characteristic feature is the employment of a fusible, soluble, or liquefiable material, such as paraffin wax, or a mixture of paraffin wax and stearin, employed in such manner in the manufacture of the molds in which the concrete or like composition is poured or otherwise introduced, that it may be readily and quickly melted off or dissolved from the cast product, after the product has set. This melting off or dissolving of the mold is readily effected, in accordance with my practice, in a heated medium such as water, wherein, on account of the lesser specific gravity of the paraffin, or its equivalent, the mold material will rise to the surface of the water and can readily be recovered for re-use. In fact, in my preferred procedure, my invention contemplates a cycle of operations, beginning, first, with the manufacture of the molds from the paraffin direct and at the place where the concrete or like products are to be made, then the pouring of the composition into the mold, the setting of the material therein, the freeing of the product from the molds by submergence in the hot water tank, and the recovery of the paraffin as it accumulates on the surface of the water vat, and its re-use for the manufacture of additional molds.

The generic features incident to the practice of my invention are capable of embodiment in a number of different ways. One of these specific embodiments is shown, by way of illustration, in the accompanying drawings, with several modifications.

Figure 21:
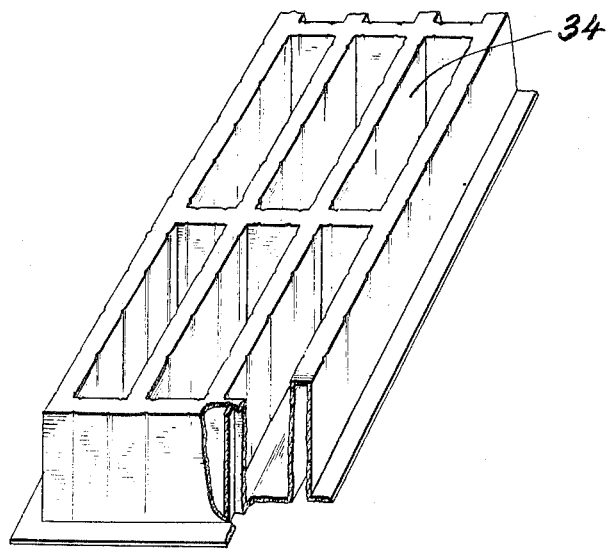

In the drawings, Figure 1 represents, partly in section and partly in elevation, one form or modification of apparatus adapted for the practice of my invention, in so far as the manufacture of the molds is concerned; Fig. 2 represents a view of the same parts, at the termination of a dipping operation; Fig. 3 represents a like view of the mold-former, and shows a multiple mold made thereby and stripped from the mold-former; Fig. 4 represents in section the multiple mold, mounted upon a wheeled platform and in the act of being filled with the poured concrete; Fig. 5 represents, in longitudinal section a suitable form of hot water tank and indicates the manner in which the paraffin or its equivalent constituting the mold walls is recovered for re-use, while the concrete product is set free; Fig. 6 represents a section taken on the line 6—6 of Fig. 2; Fig. 7 represents a section taken on the line 7—7 of Fig. 3; Fig. 8 represents, in perspective, one of the brick products made in the mold of Fig. 7; Fig. 9 represents a vertical section and partial elevation of a modification of the construction shown in Fig. 3; Fig. 10 represents, in perspective, one of the products made in the mold of Fig. 9; Fig. 11 represents, in perspective, a multiple mold of the kind produced by the apparatus shown in Fig. 1; Fig. 12 represents, in perspective, a fragmentary view of the mold, made in the device shown in Fig. 9; Fig. 13 represents a section on the line 13—13 of Fig. 11; Fig. 14 represents a section on the line 14—14 of Fig. 11; Fig. 15 represents, partly in section and partly in elevation, a modification of the mold-forming apparatus shown in the preceding figures; Fig. 16 represents a like view of the mold-forming devices immediately after the dipping operation. Fig. 17 represents the same after the stripping of the multiple mold; Fig. 18 represents the inversion of said mold, and the pouring operation as conducted therein; Fig. 19 represents a view, similar to Fig. 16, of a further modification. Fig. 20 represents in perspective, a bottom view, partly broken away, of the mold-former shown in Fig. 15. Fig. 21 represents a corresponding view of the mold produced by said mold-former.

Referring to the drawings, 1 indicates a suitable tank for holding paraffin, 2, or its equivalent, which tank may be heated in any suitable manner to melt the paraffin, as, for instance, by a gas burner, 3.

The mold-forming devices proper, in the exemplification shown in Figs. 1, 2, and 3, consist of a base 4, mounted to slide upon the guide rods 5, of a stripper frame, having a yoke 6, provided with an internally screw-threaded central boss 7, with which engages the externally screw-threaded stem 8, carrying the hand wheel 10. The base, 11, of the stripper frame is provided with suitable apertures through which project the mold-formers proper, 12, which are preferably hollowed out or recessed internally, as shown at 12ª, and are provided with vent openings, 13.

Intermediate of the mold-former 12, and spaced at intervals apart (as indicated in Fig. 6), auxiliary formers, 14, may be employed. Whenever it is desired to have a cellular structure involving the production of strengthening cross webs in the dividing walls or partitions of the multiple mold, as will hereinafter more fully appear; but these auxiliary-formers, although highly useful for their intended purpose, may be dispensed with where the formation of cross webs in the partition is not desired.

It is important for the successful practice of my invention that the mold-formers, as they are dipped into the melted bath of paraffin or its equivalent, shall have already received a surface coating of water. This water should be relatively colder than the melted material, and is an efficient safeguard against such adhesion of the film of paraffin to the mold-formers as would interfere with the stripping of the completed mold from the mold-formers. I have found that this can be fully and conveniently assured by making the mold-formers of a material which will absorb moisture, thus remaining permanently wet to a greater or less degree, such as wood, or by making them, say, of metal, having an outer sheath or coating of such moisture-absorbing wood, cloth, leather, or the like, kept permanently wet, by dipping it from time to time in cold water, or otherwise giving it the desired cold water film sufficient for the purpose.

In the paraffin vat 1, I place a quantity of water, 15, which will serve as an intermediary between the gasburner, 3, or other heating source, and the paraffin to be melted. When the paraffin is in the melted condition, and with the moistened mold-forming devices in the adjustment indicated in Fig. 1, I dip the mold-former proper (12) and the auxiliary mold-formers, 14, (if the latter are to be employed) into the melted paraffin. I thereupon immediately withdraw the mold-formers from the melted paraffin. As indicated in Fig. 2, on the withdrawal of the mold-formers, it will be found that they will carry with them, a thin film of paraffin, which may, if necessary, after cooling slightly, be increased in thickness to the desired degree, by a repetition or repetitions (say, from 2 to 4) of the dipping operation. The film of paraffin, or its equivalent, thus obtained upon the mold-formers constitutes the thin-walled paraffin mold of my invention, in the sense that it is of a character which will permit pouring of the concrete composition or a like mixture into it, and the subsequent easy melting off of the paraffin from the molded product after the latter has set, so that the paraffin may be in condition for re-use. When this thin-walled mold is produced by dipping the mold-formers a number of times in succession into the liquid paraffin, the walls of the mold are made up of a plurality or series of film-like layers of paraffin. The mold is thus stronger and capable of resisting lateral stresses to a greater degree than if its walls were homogeneous. This is due to the fact that the chilling of each successive layer or film of paraffin, after it has been applied, causes such layer to contract and tightly grip itself upon the previous layer or layers, so that the laminated mold obtained by the successive dipping and chilling operations has correspondingly greater strain-resisting qualities.

As indicated in Fig. 3, the paraffin mold, indicated by the numeral 16, may then be readily stripped from the mold-formers by turning the hand wheel 10, in such direction that the mold-formers will ride through the base 11 of the stripper. The moist surfaces of the mold-formers, as has been hereinbefore explained, so far minimizes adhesion between the paraffin and the mold-formers themselves that the stripping operation is attended with no difficulty, and the mold is received intact upon the plate or table, 17, provided for its reception.

By reference to Fig. 6, it will be noticed, that in my preferred practice, I not only employ a plurality of the mold-formers transversely of the base 4, thereby forming transverse rows of mold-formers, but I also form longitudinal series of the mold-formers. This is, of course, for the purpose of making at a single operation, as many of the individual thin-walled paraffin molds as may be serviceable for the purposes intended, this capability being of special importance where a large output of the products is contemplated, as, for instance, in the manufacture of regular shaped concrete products in large demand on the market, such as bricks, tiles, and the like. For this manufacture, and for like uses, I prefer to arrange the mold-formers sufficiently far apart, as indicated in Fig. 6, to provide a hollow wall, as the dividing partition, or partitions, between the members of the transverse series, as well as between the members of the longitudinal series of mold-formers. This hollow wall may be devoid of cross-webs, i. e. it may consist of vertical sides joined at their tops only. In some instances, however, I prefer to provide cross-webs across the side walls thereby bonding them together into hollow party-walls. In order to produce such cross-webs, 18, across these hollow walls or dividing partitions, auxiliary formers, such as the auxiliary formers 14, may be employed. These auxiliary formers, 14, I have indicated in Fig. 6 by way of example, as applied to the formation of cross-webs across the hollow walls formed by the transverse series of mold-formers 12. The formation of the cross-webs, 18, is, of course, due to the formation of a film of paraffin, along the edges of these auxiliary formers, 14, as they emerge from the paraffin vat. If they should be omitted, as, for instance, between the longitudinal series of the mold-former, 12, the cross-webs in the mold would not be formed, but the dividing partition would be hollow from end to end, as indicated at 19, in Fig. 6. It will be further understood that if the individual mold-formers, 12, are located more closely together, or if the dipping operation is repeated for a sufficient number of times, the dividing wall or partition between the individual mold-recesses or cavities, can be made solid instead of hollow, although, in most instances. I prefer the hollow structure, because, for the same amount of paraffin employed, the mold is of a more rigid and stable construction, and less liable to deformation in use. So, also, the cross-webs, although they may be omitted, are nevertheless, strengthening elements which, in some instances, are especially serviceable.

In Figs. 7, 11, 13 and 14, I have illustrated in detail, the construction of the multiple or cellular mold made by the employment of the mold-forming devices shown in Figs. 1, 2 and 3. The mold thus formed is of very substantial stability. The longitudinal and cross partitions, in spite of the thinness of the walls or paraffin films constituting them, serve to brace the entire structure into a unit which will withstand even rough handling, and the outlying rim, 20, extending beyond the exterior walls of the composite mold, adds a further element of strength and stability to the structure.

In Fig. 4 I have illustrated one of these multiple molds, mounted upon a truck, 21, having suitable wheels. The concrete composition, or the like, is shown as occupying three of the transverse cells or recesses of the mold, while the fourth of the series is in the act of being filled from the supply spout, 22. At the termination of this filling operation, the trucks, with the filled molds, are taken away to a locality where the molded products are permitted to set sufficiently for the next ensuing step, to wit, the melting off of the paraffin. As soon as the molded products have thus sufficiently set, the truck, with the filled molds upon it, is run into a submergence tank, 23 as indicated, for instance, in Fig. 5. This tank contains a body of water, 24, which may be heated in any suitable way, as, for instance by means of steam, electricity, or by the gas jet, 25, shown in said figure. Intermediate of the submergence tank, I arrange the partitions 26, and in the space lying between and below these partitions, the truck is brought to a temporary standstill. The heat of the water promptly melts the thin walls of the paraffin molds, whereupon the paraffin, being of lighter specific gravity than the water, rises to the surface and collects between the two partitions, 26, as indicated by the numeral 27, in Fig. 5. The molded concrete products, thus relieved of their outer coating of paraffin, then rest directly upon the truck, and are moved out of the tank upon the truck, to give place to the next succeeding truckload of filled molds. In so far as the partitions, 26, are concerned, the one nearest the entrance side for the truck may be omitted without special disadvantage, inasmuch as their main purpose (i. e. to prevent the paraffin from spreading over the surface of the water at the place where the truck and its products emerge therefrom) is efficiently performed by the other.

From the submergence tank, the molded products are conveyed either to a steam curing room, or are permitted to finish their curing, setting and hardening, in a hot water bath, similar to the submergence tank. The body of paraffin, 27, may be then collected, as soon as it has accumulated in sufficient quantities, and can be re-used in the general cycle of operations.

The particular form of mold shown in Figs. 7, 11, 13 and 14 is adapted to produce the brick shown in Fig. 8, of a size and shape adapted for the usual building purposes, for which ordinary clay brick or pressed brick, are employed, but it will, of course, be evident, that the particular shape and dimensions of the product thus illustrated, are not of the essence of the invention, inasmuch, and especially as hereinafter shown, the invention is applicable to much more widely extended uses.

In the form of apparatus shown in Fig. 9, the stripper frame is provided with a series of depending projections, 28, extending down through and occupying the hollow interiors of the mold-formers, 12', when the latter have been retracted to the mold-stripping position illustrated in that figure. There are thus produced hollow projections spaced apart in the mold, as indicated in Fig. 12, which form, in conjunction with the side walls and cross and longitudinal partitions, 30 31, mold cavities for producing the rectangular tile shown in Fig. 10. It will also be noted that, in the apparatus of Fig. 9, I have shown the mold-formers 12', as provided with an outer covering, 33, which may be of absorbent material, such as cloth, or leather, adapted to absorb and retain moisture, so as to be covered with a film thereof, as hereinbefore explained.

In Figs. 15, 16 and 17, I have shown another form of apparatus for the practice of my invention, and in Fig. 20 I have shown in perspective a bottom view of the mold-formers thereof. These mold-formers, 12$^b$, as arranged, have the general appearance of a picket-fence, and, in rising from the paraffin vat, produce a mold, which, when inverted, has hollows in the side walls and in the cross and longitudinal partitions, all as shown in Fig. 21, wherein the casting cavities are indicated by the numeral 34. The peculiar wavy conformation of the surfaces, as shown in Fig. 21, is due to the particular spacing of the mold-formers, 12$^b$. In order to prevent the pocketing of air in the spaces between the mold-formers, vents 35 are provided.

In the form of apparatus shown in Fig. 19, the mold-formers 12$^c$ are intended to be continuous strips instead of being made up of series of individual pickets and similar vents 35 are provided for a like purpose. It will, of course, be understood that wherever a vent is necessary to insure the success of a dipping operation, the closing of the vent by the first dip will necessitate its reopening should it be desired to repeat the dipping operation to obtain walls of greater thickness; or, in the alternative, the obtaining of such additional wall thickness (and even the obtaining of the first film) could be obtained by inverting the mold-formers, pouring paraffin therein, and quickly draining it by again restoring the mold-formers to the pendant position.

Fig. 18 represents the mold, as made by either of the last described forms of apparatus, in the act of being filled by the concrete or like composition.

Emphasizing further the feature of moistening the surfaces of the mold-formers before dipping them into the melted paraffin or its equivalent, I desire to point out that not only does the film of moisture prevent adhesion of the paraffin to the mold-formers, but it also serves to vent the mold cavities, for the reason that as soon as the stripping operation is started, the external air finds ready access to the interior of the mold cavities by passing into the extremely small but sufficient interspaces between the walls of said cavities and the surface of the mold-formers, the presence of the film of moisture being found in practice not to interfere with this venting of the mold cavities.

In the practical use of my invention, although the concrete composition or the like may be introduced into the mold cavities in any desired way and in any desired consistency, I nevertheless prefer to pour it in in a liquid condition. In making up a concrete composition to be thus poured, I also contemplate in most instances preparing the liquid composition as follows: I supply to a rotating drum, or similar agitating and mixing device, the desired proportion of cement, which is to form an element of the final composition, and I agitate and mix the cement with warm water in excess for, say half an hour or more, until the particles of cement have had an opportunity to fully absorb the amount of water that they are adapted to take up. The particles of cement thus become correspondingly swollen and are in such condition as to readily adhere to the sand and gravel. I thereupon decant the excess of water, after the drum has been brought to a standstill and after the cement has settled, and I then add to the cement the predetermined quantity of sand and gravel to make up the final mixture. The final mixture of cement, sand and gravel, making up the concrete composition, is then in a fluid condition and can be readily poured into the molds.

It will be understood that the mold represented in Fig. 21 presents to the concrete composition introduced into its casting recesses, the outside or reverse surface of the paraffin film applied during the dipping operation; in contra-distinction to the molds shown in Figs. 11 and 12, wherein the concrete composition introduced into the mold cavities comes in contact with the inner surface of the paraffin film or layer, that is, the surface which, in the dipping operation, is adjacent to the surface of the mold-formers. There are certain advantages in both constructions. Thus, the concrete product cast in the recesses of the molds shown in Figs. 11 and 12 are usually more exact reproductions of the mold-formers in so far as the sharpness of outline is concerned, whereas the casting recesses of the mold, Fig. 21, are somewhat smoother along their wall surfaces.

It will, of course, be understood that in referring to paraffin in the claims, I do not intend to restrict myself to the employment of paraffin of any particular melting point, inasmuch as the market affords paraffin products of various melting points, suitable for the purpose, nor do I intend to restrict myself to the use of paraffin alone. In fact, as hereinbefore indicated, it is entirely feasible to employ a mixture of paraffin and stearin, or any other equivalent for paraffin or for a mixture of paraffin and stearin, having like capabilities of use, that is, capable of being made into a mold within which the concrete or like product can be introduced by pouring or otherwise, and which, after the product is set, can be dissolved or melted off through the agency of heat, as, for instance, by means of steam, hot water, or the like.

In two other applications for Letters Patent of the United States, Serial Nos. 552,872 and 552,873 filed of even date herewith, I have described the productions of molds of paraffin, or its equivalent, (1) by the application of pressure to a semi-plastic mass of paraffin contained in a forming chamber, and, (2) by applying to a rigid frame a dip-coating of paraffin, and then attaching the paraffined frame to a paraffin base. In both of these instances, the concrete composition is introduced into the mold cavities, the composition is permitted to set, the product is released from the mold through the agency of heat, and the paraffin is recovered for re-use, all in manner similar to the like operations described in the present application. It will be understood, therefore, that the generic claims hereinafter made, covering the introduction of the concrete composition into a paraffin mold and the subsequent operations resulting in the obtaining of the final concrete product, are intended to be of a scope to likewise cover the same operations when practised in molds of the types shown and described in my two other pending applications thus referred to.

What I claim is:

1. The method of making bricks, tiles and other products of concrete, cement and the like, consisting in making a hollow seamless mold of fusible material, pouring into said mold the cement mixture in liquid or flowing condition, allowing said mixture to set, and finally removing the mold from the cement casting by fusing it, substantially as described.

2. The method of making bricks, tiles and other products of concrete, cement and the like, consisting in making a hollow watertight mold of fusible material, pouring into said mold the cement mixture in liquid or flowing condition, allowing said mixture to set, and finally removing the mold from the cement casting by fusing it, substantially as described.

In testimony whereof I affix my signature, in presence of two witnesses.

HERBERT S. OWEN.

Witnesses:
JOHN C. PENNIE,
WILLIAM H. DAVIS.